US007792684B2

(12) United States Patent
Abernethy, Jr. et al.

(10) Patent No.: US 7,792,684 B2
(45) Date of Patent: Sep. 7, 2010

(54) SYSTEM AND METHOD FOR IDENTIFYING ASSET RESTRICTIONS APPLICABLE TO MOVEMENT OF TANGIBLE ASSETS

(75) Inventors: Michael Negley Abernethy, Jr., Pflugerville, TX (US); Travis M. Grigsby, Austin, TX (US); Michael A. Paolini, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 825 days.

(21) Appl. No.: 11/620,457

(22) Filed: Jan. 5, 2007

(65) Prior Publication Data

US 2008/0167978 A1    Jul. 10, 2008

(51) Int. Cl.
*G06Q 10/00* (2006.01)
(52) U.S. Cl. ...................................... 705/1.1
(58) Field of Classification Search ............ 705/1, 705/1.1
See application file for complete search history.

(56) References Cited

U.S. PATENT DOCUMENTS

| | | | | |
|---|---|---|---|---|
| 5,948,040 | A | 9/1999 | DeLorme et al. ............ 701/201 |
| 6,122,622 | A | 9/2000 | Wiitala et al. ................ 705/28 |
| 6,321,158 | B1 | 11/2001 | DeLorme et al. ............ 701/201 |
| 6,501,421 | B1 | 12/2002 | Dutta et al. ............ 342/357.13 |
| 6,810,328 | B2 | 10/2004 | Yokota et al. ............... 701/210 |
| 6,839,707 | B2 | 1/2005 | Lee et al. ...................... 707/8 |
| 6,842,774 | B1 | 1/2005 | Piccioni ..................... 709/207 |
| 6,992,619 | B2 | 1/2006 | Harrison ................. 342/357.13 |
| 2002/0194014 | A1 | 12/2002 | Starnes et al. .................. 705/1 |
| 2003/0009345 | A1 | 1/2003 | Thorpe .......................... 705/1 |
| 2003/0055697 | A1 | 3/2003 | Macken, Jr. et al. ............ 705/7 |
| 2003/0135520 | A1 | 7/2003 | Mitchell et al. ............. 707/200 |
| 2004/0024775 | A1 | 2/2004 | Kemp ......................... 707/102 |
| 2004/0073498 | A1* | 4/2004 | Breen et al. .................. 705/27 |
| 2005/0203899 | A1 | 9/2005 | Anderson et al. .............. 707/5 |
| 2005/0267658 | A1 | 12/2005 | Yuan et al. .................... 701/36 |

OTHER PUBLICATIONS

"CounterpartyLink and Siperian Join Forces to Link Critical Business Entity Reference Data Into Counterparty Hub." PR Newswire, Nov. 13, 2006.*
Office Action for co-pending U.S. Appl. No. 11/620,465, mailed Mar. 26, 2010, 12 pages.

* cited by examiner

*Primary Examiner*—John W Hayes
*Assistant Examiner*—Allen J Jung
(74) *Attorney, Agent, or Firm*—VanLeeuwen & VanLeeuwen; Justin M. Dillon (57) ABSTRACT

A system, method, and program product is provided that identifies asset restrictions pertaining to the movement of tangible assets. The system reads a list of assets intended to be moved from a first geographical location to a new geographical location. Each of the assets in the list includes asset descriptive data. More than one geographical regions are identified that apply to the new geographical location. Regulatory items are retrieved from the identified geographical regions. The regulatory items include regulated item descriptive data that is compared with the user's asset descriptive data to match regulations applicable to assets. An exception list is generated based on the comparison that includes the regulatory items that apply to one or more of the assets.

17 Claims, 6 Drawing Sheets

Sample Items from User List

| Item ID 205 | Category 210 | General Description 215 | Detailed Desc. 220 |
|---|---|---|---|
| ABC1 | Live Animal | Canine | Pit Bull (2 yrs old) |
| ABC | Live Animal | Canine | Toy Poodle (3 yrs old) |
| FA | Firearm | Shotgun | Browning BPS |
| FAA | Firearm | Automatic | AK-47 |
| FAH | Firearm | Handgun | Beretta 92 (4.9" barrel) |
| FAHS | Firearm | Handgun | Springfield XD Subcompact (3.01") |

Compare User's Items to Regional and Sub-Regional Databases 200

110 →

225 →

Corresponding Items from Broadest Regional Database (e.g. Canada)

| Item ID 230 | Category 235 | General Desc. 240 | Detailed Desc. 245 | Restriction 250 | Link 255 |
|---|---|---|---|---|---|
| ABC | Live Animal | Canine | ... | Vaccine & Registration | Web Addr. 1 |
| FA | Firearm | ... | ... | Registration Required | Web Addr. 2 |
| FAH | Firearm | Handgun | ... | Permit Required | Web Addr. 3 |
| FAHS | Firearm | Handgun | Barrel < 4" | Item Prohibited | Web Addr. 4 |
| FAA | Firearm | Automatic | ... | Item Prohibited | Web Addr. 5 |

270 → Corresponding Items from Narrower Regional Database (e.g. Ontario, Canada)

| ABC1 | Live Animal | Canine | Pit Bull | Item Prohibited | Web Addr. 6 |
|---|---|---|---|---|---|

280 → Corresponding Items from Narrowest Regional Database (e.g. Toronto, Ontario, Canada)

| FAH | Firearm | Handgun | ... | Item Prohibited | Web Addr. 7 |
|---|---|---|---|---|---|

SYSTEM AND METHOD FOR IDENTIFYING ASSET RESTRICTIONS APPLICABLE TO MOVEMENT OF TANGIBLE ASSETS

BACKGROUND OF THE INVENTION

1. Technical Field

The present invention relates to a system and method that informs users of laws affecting the movement of assets. More particularly, the present invention relates to a system and method that compares a list of user assets to one or more regional laws and informs of the users of regulations or prohibitions that pertain to one or more of the assets.

2. Description of the Related Art

In today's global marketplace, employees or other business professionals are often relocated. While moving person's household is already a daunting task, understanding rules and regulations that apply to the person's assets in the new locale, or region, makes the task even more difficult. Compounding this challenge is the fact that multiple regional rules and regulations may apply to the person's assets.

For example, if a U.S. citizen is moving to Toronto, Canada, the laws of multiple regions will apply to the person's assets. First, national laws of Canada need to be followed. Second, the city of Toronto is in the province of Ontario, so the laws of Ontario need to be followed. Third, the city of Toronto has various ordinances that need to be followed. Depending on the laws imposed by the new regions, failure to abide by any one of the laws of the various regions can result in a variety of consequences ranging from fines to confiscation of the offending item, to, in severe cases, imprisonment of the person for taking an illegal item into a certain region. For instance, laws pertaining to firearms, especially handguns, are often much stricter in foreign countries as they are in certain parts of the United States.

Another challenge facing a person moving to a different region is that some assets may require registration. This requirement may apply to various types of items such as firearms and even pets. Identifying the necessary registration forms and registering the assets before moving to the new region is often advantageous and also expedites the movement of the person's household. However, without having familiarity to the laws and regulations of the new region, identifying assets that need to be registered can be difficult. Moreover, locating the proper registration forms that need to be completed can be quite challenging for the person.

SUMMARY

It has been discovered that the aforementioned challenges are resolved using a system, method and computer program product that identifies asset restrictions pertaining to the movement of tangible assets. The system reads a list of assets intended to be moved from a first geographical location to a second geographical location. Each of the assets in the list includes asset descriptive data. More than one geographical regions are identified that apply to the new geographical location. For example, if an asset is intended to be moved to Toronto, Canada, geographical regions might include the country of Canada, the province of Ontario, and the city of Toronto. In addition, other regions, both larger and smaller, can be included, such as North America (e.g., NAFTA rules, etc.), and smaller regions, such as restrictions that apply to a particular homeowner association or a particular building where the asset is intended to be moved. Regulatory items are retrieved from the identified geographical regions. The regulatory items include regulated item descriptive data that is compared with the user's asset descriptive data to match regulations to assets. An exception list is generated based on the comparison that includes the regulatory items that apply to one or more of the assets.

In one embodiment, the geographic regions are ordered based on size of the geographic regions, so that regulatory items corresponding to smaller geographic regions are retrieved before retrieving the regulatory items corresponding to larger geographic regions. Taking the example above, in this embodiment, the regulations that apply to the city of Toronto would be applied to the assets before the regulations that apply to the entire country of Canada.

In one embodiment, a "registration asset" is identified from the list of the user's assets that requires a registration in order for the asset to be moved to the new geographical region. In this embodiment, a network address is retrieved that corresponds to an electronic form (e.g., a web page) that corresponds to the registration. The network address (e.g., the link to the web page) is included in the generated exception list.

In a further embodiment, when the user selects the network address (e.g., clicks on the link included in the exception list), then the electronic registration is retrieved and displayed to the user and the user completes the electronic registration. The completed registration form is then transmitted to a server (e.g., a web server over the Internet) that processes the completed registration form. In a still further embodiment, the asset descriptive data that corresponds to the registration asset is retrieved and the retrieved data is automatically filled into fields displayed on the displayed electronic registration form.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
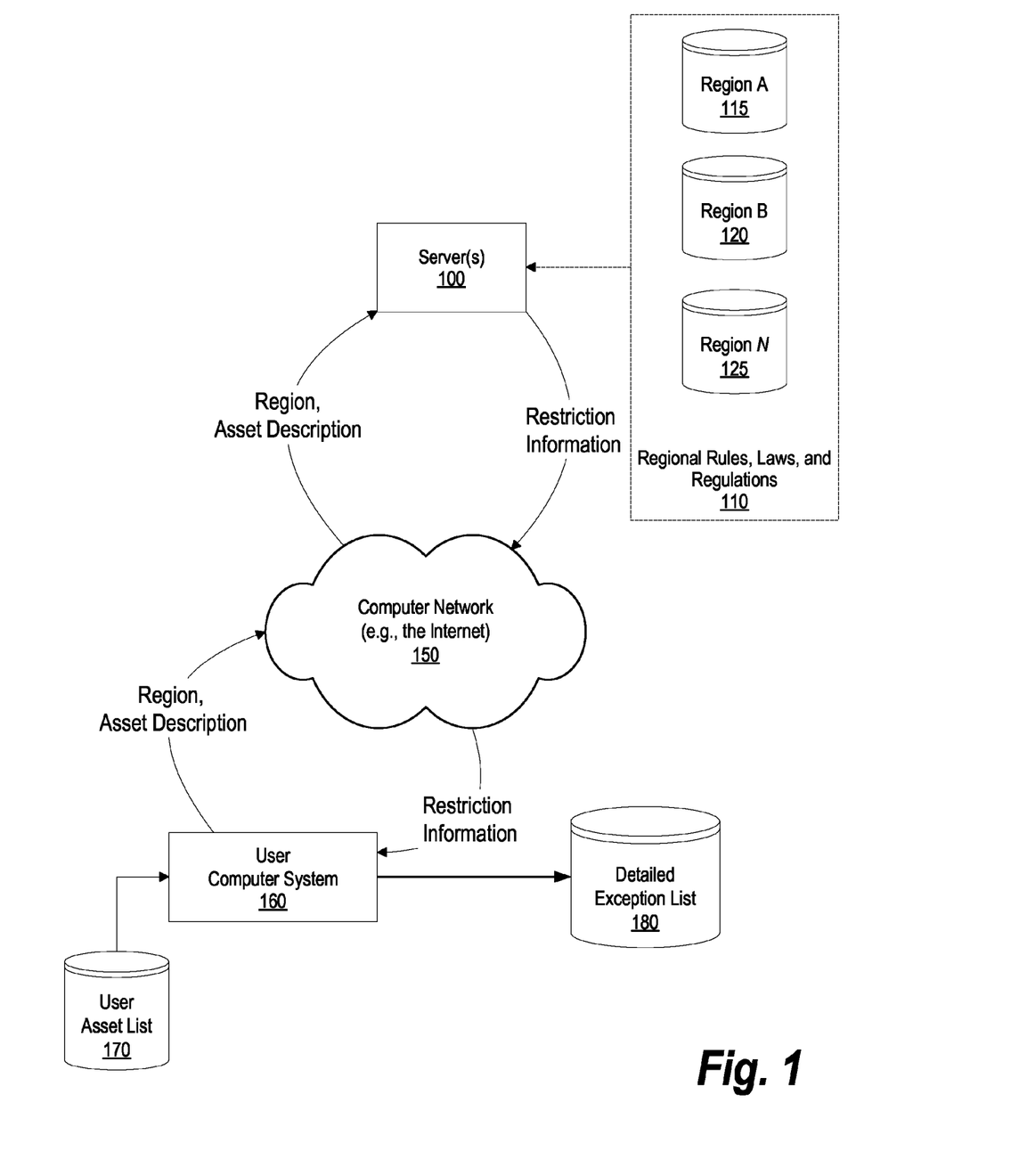
FIG. 1 is a high-level diagram showing components used in comparing a person's assets to various regional rules, laws, and regulations.

FIG. 1 is a high-level diagram showing components used in comparing a person's assets to various regional rules, laws, and regulations. One or more servers (100) are responsible for serving regional data 110. Regional data 110 includes multiple regions, depicted as Region A (115), Region B (120), through Region N (125). Regional data includes regulatory items and regulated item descriptive data. For example, if a user intends to move assets to Toronto, Canada, then the regions that would be used to identify regulatory items and associated regulated item descriptive data would include the country of Canada, the province of Ontario, and the city of Toronto. The regional data for each of these regions can be served by a single server, or multiple servers. For example, in a centralized system, a single server could be used to maintain and server data for the country of Canada, the province of Ontario, and the city of Toronto. On the other hand, in a more distributed system, one server could be used to serve data pertaining to the country of Canada, a second server could be used to serve data pertaining to the province of Ontario, and a third server could be used to serve data pertaining to the city of Toronto. Further regions can be applied to both broaden and narrow the regional data. For example, regulations that apply to a multi-national region (e.g., North America, NAFTA, etc.) can be applied as a broader region, and a region such as a particular homeowners association or regulations pertaining to a commercial building can be applied as narrower regions, depending upon where the asset is moving.

In one embodiment, narrower regional data is applied to the assets being moved before the broader regional data. This is because, in many environments, a narrower regions rules, laws, and regulations might be more restrictive than the broader region(s) to which the narrow region belongs. For example, a particular asset, such as a handgun, may be permitted in a broader region, such as the province of Ontario, but a region within Ontario (such as Toronto) may prohibit or restrict such assets. Conversely, it is exceedingly rare for a narrower region (such as the city of Toronto) to have less restrictive rules, laws, and regulations than the regions to which it belongs (such as the province of Ontario and the country of Canada).

Server(s) 100 provide restriction information to user computer system 160 by transmitting the regional restriction data to the user computer system through computer network 150, such as the Internet. In one embodiment, user computer system 160 transmits regional identification and asset description information (retrieved from user asset list 170) to server(s) 100 and the server(s) compare the user's asset descriptive data to the regulated item descriptive data in order to identify regulatory items that apply to the user's assets. In another embodiment, user computer system 160 receives the regulated item descriptive data from server(s) 100 and the user's computer system compares the received regulated item descriptive data to the user's asset descriptive data (retrieved from user asset list 170) in order to determine which regulatory items apply to the user's assets.

The result of comparing the user's asset descriptive data to the regulated item descriptive data for the various regions is detailed exception list 180. Detailed exception list 180 includes user assets to which one or more regulatory items apply. For example, if one of the assets the user wants to move is a firearm, such as a handgun or a shotgun, then detailed exception list 180 would include any rules, laws, or regulations (collectively, "regulatory items") that apply to firearms. These regulatory items might include a prohibition against the item, registration requirements, or the like. In addition, if registration of the asset is required, then detailed exception list includes a link to an electronic registration form that the user needs to complete in order to register the asset. The completed registration is then sent to a server, such as a web server, for processing.

Figure 2:
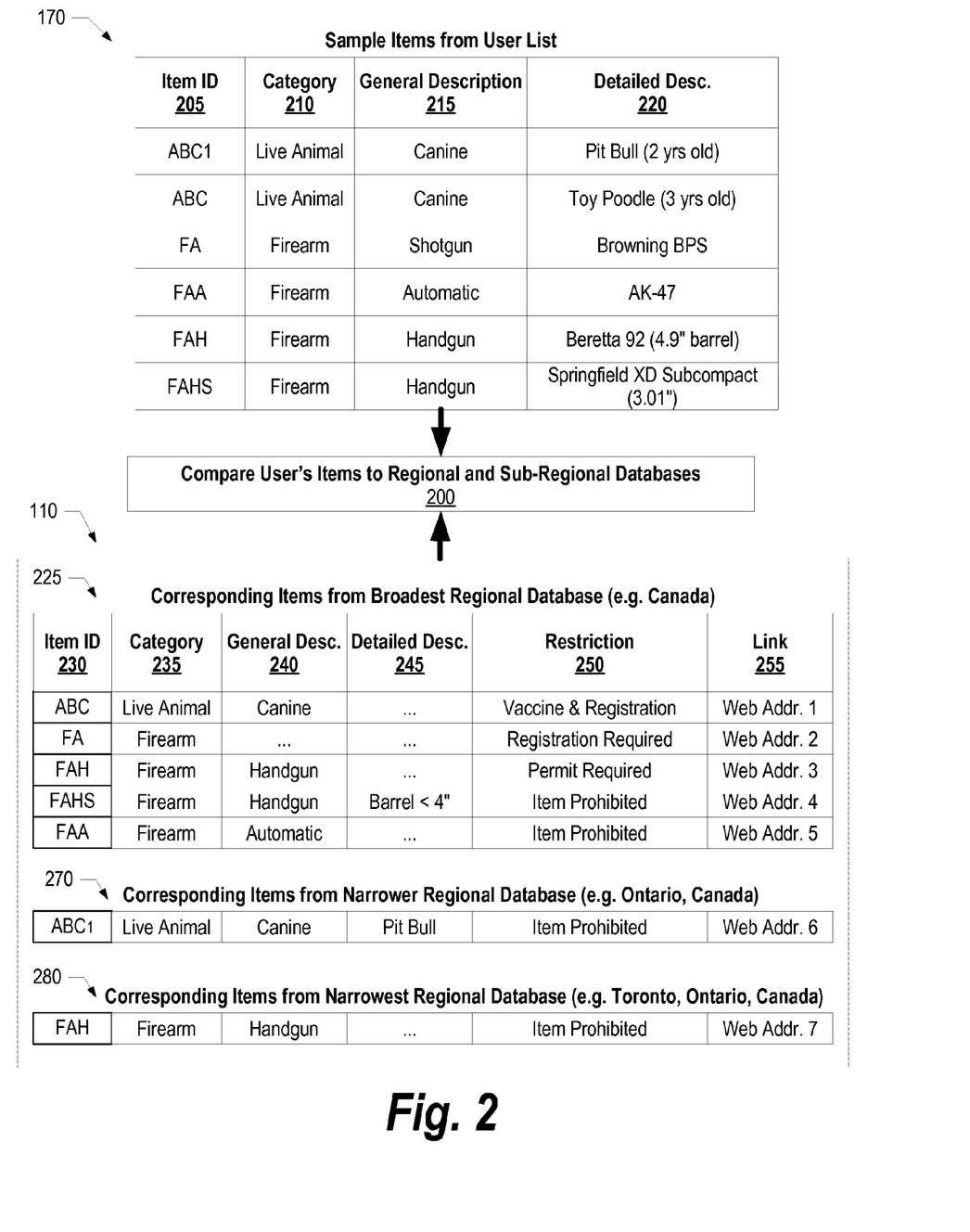
FIG. 2 is a diagram showing an example of a user's asset list and comparable items selected from three sample regional databases of regional regulations.

FIG. 2 is a diagram showing an example of a user's asset list and comparable items selected from three sample regional databases of regional regulations. User asset list 170 includes a list of assets that the user wishes to move to a new location. Various fields include asset descriptive data for each asset. Item identifier field 205 is a unique identifier that is assigned to each asset in the list. Item category field 210 is used to store a broad category that applies to the asset. General description field 215 is used to store a general description of the asset, and detailed description field 220 is used to store a more detailed description of the asset. In the example shown, the user has included six assets in user asset list 170. Two of the assets are dogs and four of the assets are firearms. Item identifier ABC1 corresponds to a two-year-old canine that is identified as being a "pit bull" breed. Item identifier ABC corresponds to a three-year-old canine that is identified as being a "toy poodle" breed. Of the firearms, item identifier FA corresponds to a particular model of a shotgun, item identifier FAA corresponds to an automatic weapon (an AK-47), item identifier FAH corresponds to a particular model of handgun (a Baretta 92) that has a 4.9 inch barrel, and finally, item identifier FAHS corresponds to another model handgun (a Springfield XD Subcompact) that has a shorter (3.01 inch) barrel.

Comparison routine 200 is used to compare the asset descriptive data included in user asset list 170 with regulated item descriptive data stored in regional databases. Using the example introduced in FIG. 1 where the user desires to move assets to Toronto, Canada, the regulated item descriptive data is retrieved from three regions—the broadest region being the country of Canada (regional regulatory item descriptive data 225), a second region being the province of Ontario (regional regulatory item descriptive data 270), and the narrowest region being the city of Toronto (regional regulatory item descriptive data 280). The databases including the regional regulatory item descriptive data include fields used to match regulations to the user's assets as well as regulatory item fields. The fields used to match regulations to the user's assets include item identifier field 230, category field 235, general description field 240, and detailed description field 245. These fields contain data similar to the data described for the corresponding fields in the user asset list (fields 205 through 220). Regulatory item fields include restriction field 250 that includes general restriction information such as whether registration of the asset is required or if movement of the asset to the region is prohibited. Link field 255 is a network address (e.g., a link to a web page) where the user can receive further information regarding the restriction. This information can also include a link to an online electronic registration form that the user can retrieve and complete in order to register an asset.

Note that narrow regions sometimes apply regulations that are more restrictive than the broader regions. For example, the Toronto database (280) includes a restriction that prohibits handguns that are otherwise permitted in the broader region of Canada (Canada database 225). Note that the Canadian regulations (225) only prohibit handguns with barrels shorter than 4 inches (thus, item FAHS corresponding to the Springfield XD Subcompact is prohibited in Canada because its barrel is shorter (3.01 inches) than the 4 inch minimum length. While Canadian regulations require a permit for handguns with barrels longer than 4 inches (e.g., the Baretta 92), the Toronto regulations prohibit all handguns regardless of the barrel length. Likewise, while dogs are allowed in Canada so long as they are vaccinated and registered, an Ontario regulation prohibits pit bulls from being moved to the Ontario province.

Figure 3:
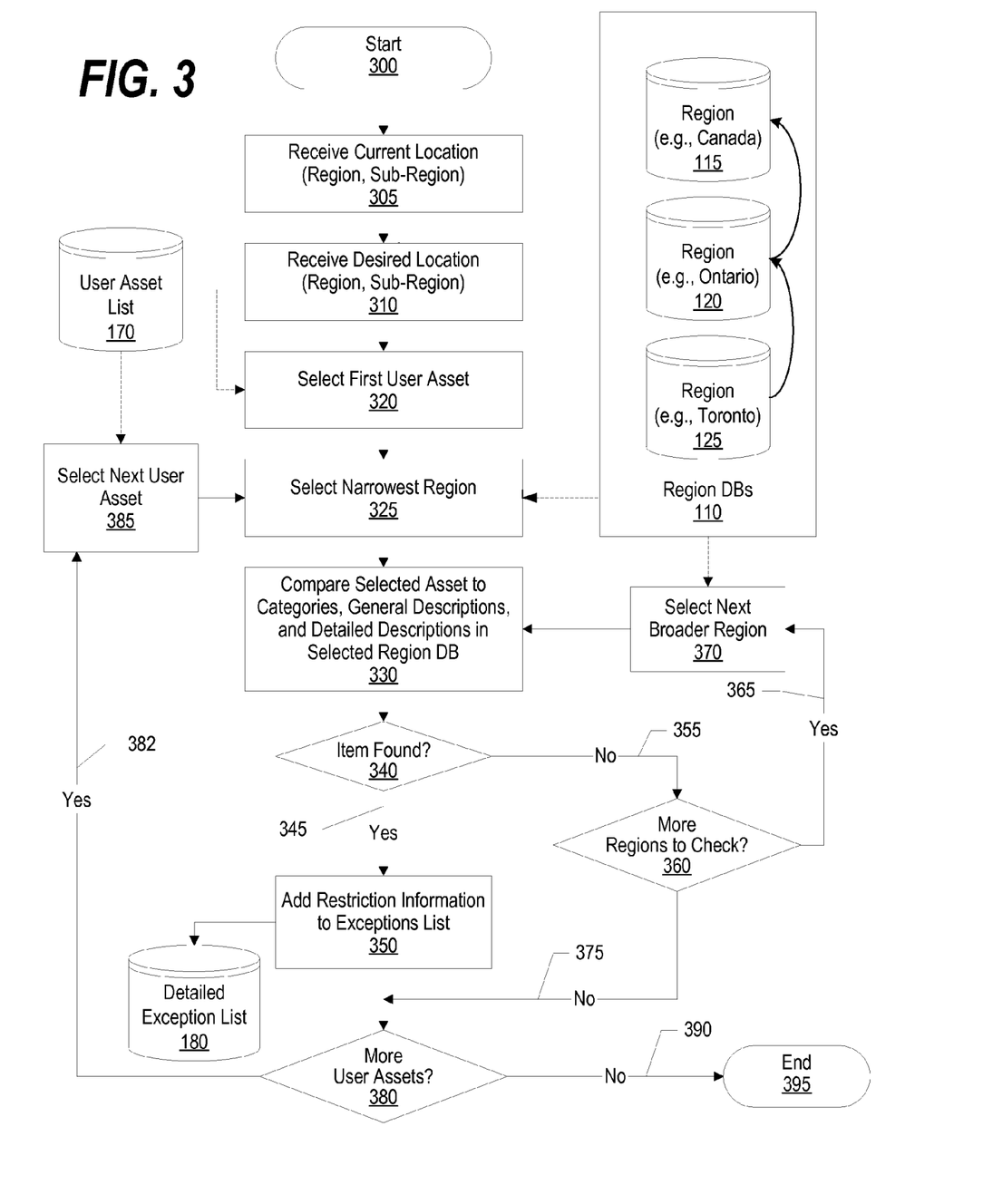
FIG. 3 is a flowchart showing the steps taken to compare the user's asset list to multiple sets of regional rules, laws, and regulations.

FIG. 3 is a flowchart showing the steps taken to compare the user's asset list to multiple sets of regional rules, laws, and regulations. Processing commences at 300 whereupon, a step 305, the user's current location is retrieved. For example, if the user's current location is Austin, Tex., the regions that would apply would include the country of the United States, the state of Texas, and the city of Austin. At step 310, the desired location is retrieved (e.g., the location to where the user desires to move assets). At step 320, the first user asset is selected from user asset list 170.

At step 325, the narrowest region is selected. Using the example introduced in FIG. 1 where the user desires to move to the city of Toronto which is located in the province of Ontario and the country of Canada, the narrowest region is the city of Toronto. So, at step 325, the regulated item descriptive data pertaining to the city of Toronto (e.g., database 125) is selected. At step 330, the selected asset descriptive data (e.g., asset identifier, asset category, asset broad description, asset detailed description) is compared to the regulated item descriptive data (e.g., regulated asset identifiers, regulated asset categories, regulated asset broad descriptions, and regulated asset detailed descriptions). A determination is made as to whether a regulation matches the user's asset descriptive data based on the comparison (decision 340). If a regulation matches the asset, then decision 340 branches to "yes" branch 345 whereupon, at step 350, the regulated item restriction information is added to detailed exception list 180.

Returning to decision 340, if the asset did not match any regulations from the selected regional database, then decision 340 branches to "no" branch 355 whereupon, another determination is made as to whether there are more regions to check. If there are more regions to check, then decision 360 branches to "yes" branch 365 whereupon, at step 370, the next broader region is selected from regional databases 110 and processing loops back to compare the regulations of the newly selected region to the selected asset. Using the Toronto, Canada example, if no Toronto regulations match the asset, then step 370 would select the Ontario provincial regulations and step 330 would apply the Ontario regulations to the asset. If no Ontario regulations apply to the asset, then decision 360 would branch to "yes" branch 365 again and then the Canadian national regulations would be selected at step 370 and applied against the user's asset. This looping continues until a region is found with a regulation that matches the asset (decision 340 branching to "yes" branch 345), or there are no more regions to check, whereupon decision 360 branches to "no" branch 375 and no regulations are applied to the asset.

After the selected asset has been processed, a determination is made as to whether there are more assets in user asset list 170 that need be to processed (decision 380). If there are more assets to process, decision 380 branches to "yes" branch 382 whereupon, at step 382, the next asset is selected from user asset list 170 and processing loops back to process the newly selected asset. This looping continues until all assets in user asset list 170 have been processed, at which time decision 380 branches to "no" branch 390 and processing ends at 395.

Figure 4:
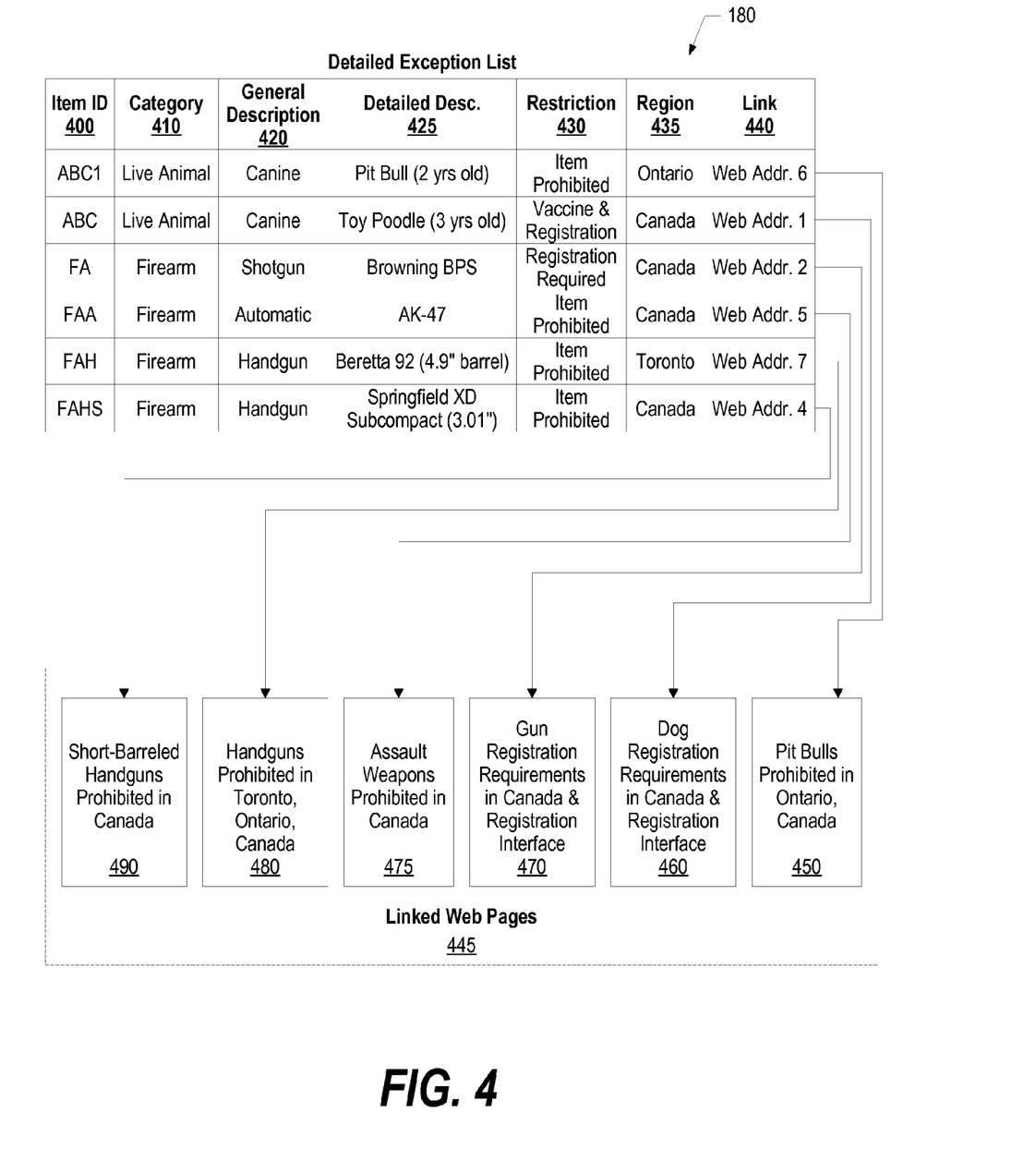
FIG. 4 shows an example of an exception list that results from comparing the user's assets to the various sets of rules, laws, and regulations as well as web pages that are linked to items in the exception list.

FIG. 4 shows an example of an exception list that results from comparing the user's assets to the various sets of rules, laws, and regulations as well as web pages that are linked to items in the exception list. Using the detailed asset list and the regulatory data shown in FIG. 2 and processing this data using the steps shown in FIG. 3 result in detailed exception list 180 shown in FIG. 4. Detailed exception list 180 includes a number of fields to identify the assets as well as fields used to convey regulatory information to the user. Item identifier field 400 is an identifier that corresponds to the asset. Category field 410 shows the general category to which the asset belongs. General description field 420 includes the general description that applies to the asset and detailed description field 425 includes the detailed description that applies to the asset. Restriction field 430 is the restriction data retrieved from one of the regional databases. The restriction field informs the user generally of the restriction that applies to the asset, such as if the asset is prohibited Region field 435 shows the particular region that has the particular restriction. Link field 440 is a network address, such as an address of a web page, that the user can use to access more information pertaining to a particular restriction. In the case where registration of an asset is required, the address stored in link field 440 can provide a registration interface that the user can use to register the asset.

Linked web pages 445 depict the various web pages that are displayed when the user selects the network addresses that are included in link field 440. The first item in the user's asset list was a two-year-old pit bull. This item is shown as being prohibited because of a regulation from the Ontario region. When the user selects the network address (web addr. 6), web page 450 is displayed with information pertaining to the prohibition of pit bulls in the Ontario province.

The second item in the user's asset list is a three-year-old toy poodle. The restriction for this breed of dog is that vaccination and registration are required, but, unlike pit bulls, this breed of dog is not prohibited. When the user selects the corresponding network address (web addr. 1), web page 460 is displayed with information pertaining to dog registration requirements in Canada as well as a registration interface. The user can use the registration interface to register the toy poodle prior to moving the dog to Toronto.

The third item in the user's asset list is a particular model shotgun (a Browning BPS). This firearm is permitted, however registration of the shotgun is required. When the user selects the corresponding network address (web addr. 2), web page 470 is displayed with information pertaining to firearm registration in Canada as well as a registration interface. Similar to the dog registration, the user can use the firearm registration in order to register the shotgun prior to moving the gun to Toronto.

The fourth item on the list is an automatic weapon (an AK-47). This item is shown as being prohibited because of a regulation from the broadest (Canada) region that prohibits automatic weapons in the country. When the user selects the network address (web addr. 5), web page 475 is displayed with information pertaining to the prohibition of assault weapons in the country of Canada.

The fifth item on the user asset list is a handgun, particularly a Baretta 92 with a 4.9 inch barrel length. This item is shown as being prohibited because of a regulation from the narrowest (Toronto) region that prohibits handguns in the city of Toronto. When the user selects the network address (web addr. 7), web page 480 is displayed with information pertaining to the prohibition of handguns in the city of Toronto.

The last item on the user asset list is another handgun, particularly a Springfield XD Subcompact with a 3.01 inch barrel length. This item is shown as being prohibited because of a regulation from the broadest (Canada) region that prohibits short barreled handguns in the country of Canada (i.e., handguns with barrels shorter than 4 inches). When the user selects the corresponding network address (web addr. 4), web page 490 is displayed with information pertaining to the prohibition of short barreled handguns in Canada.

Figure 5:
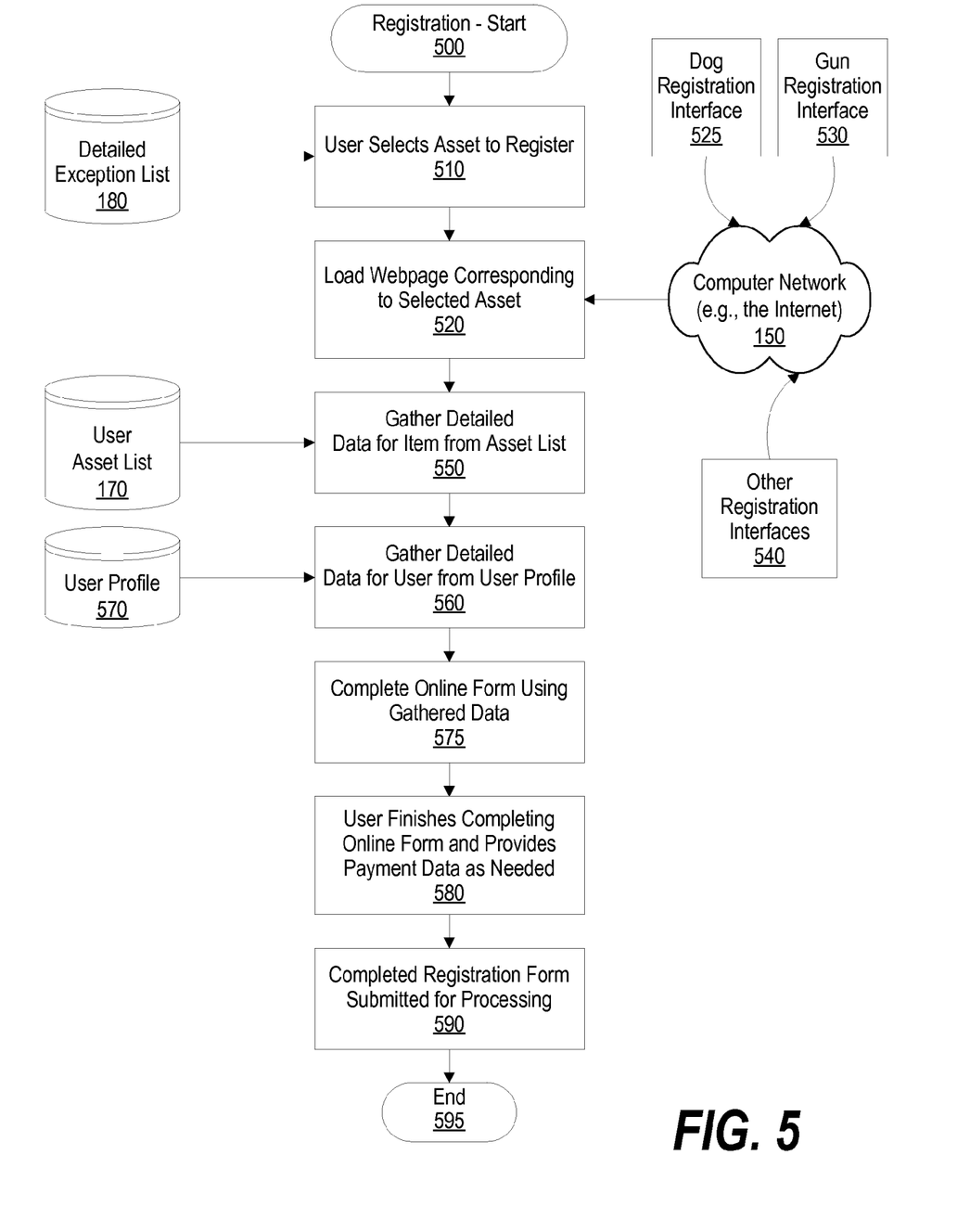
FIG. 5 shows a flowchart of the steps taken by a user to complete various registration processes using the information provided in the exception list.

FIG. 5 shows a flowchart of the steps taken by a user to complete various registration processes using the information provided in the exception list. Processing commences at 500 whereupon, at step 510, the user selects an asset to register from detailed exception list 180. At step 520, a webpage is loaded that corresponds to the selected asset. The link, or network address, included in the detailed exception list corresponds to a webpage in one or more of the regions where the asset is being moved. Examples of registration interfaces include dog registration interface 525 and gun registration interface 530. Other registration interfaces 540 are also provided for assets other than dogs and guns that need to be registered. The webpage is transmitted through computer network 150, such as the Internet, to the user's computer system and displayed to the user on the system display.

At step 550, asset data is gathered from user asset list 170 and used to partially complete the registration form (e.g., data that describes the asset being registered, such as the asset's unique identifier (serial number, etc.), description, and the like). At step 560, user data is gathered from user profile 570. User data retrieved from user profile 570 includes data used to identify the user or asset owner, such as the asset owner's name, address, and contact information. In addition, user profile 570 includes the street address (if known) of where the asset is being moved in the new location (e.g., the street address of the asset owner's new residence in Toronto, Canada). Furthermore, if a payment is needed to register the item, the payment information (e.g., credit or debit card information) is also retrieved from user profile 570.

At step 575, the online electronic registration form is completed using the data gathered from user asset list 170 and user profile 570. At step 580, the user finishes completing the online electronic registration form and, if payment data was not provided by user profile 570, the user provides the payment data (e.g., entering the credit or debit card information) as needed to pay for the registration. At step 590, the completed electronic registration form is submitted for processing (e.g., sent to a web server used by one or more of the regions to process such registrations). Processing thereafter ends at 595.

Figure 6:
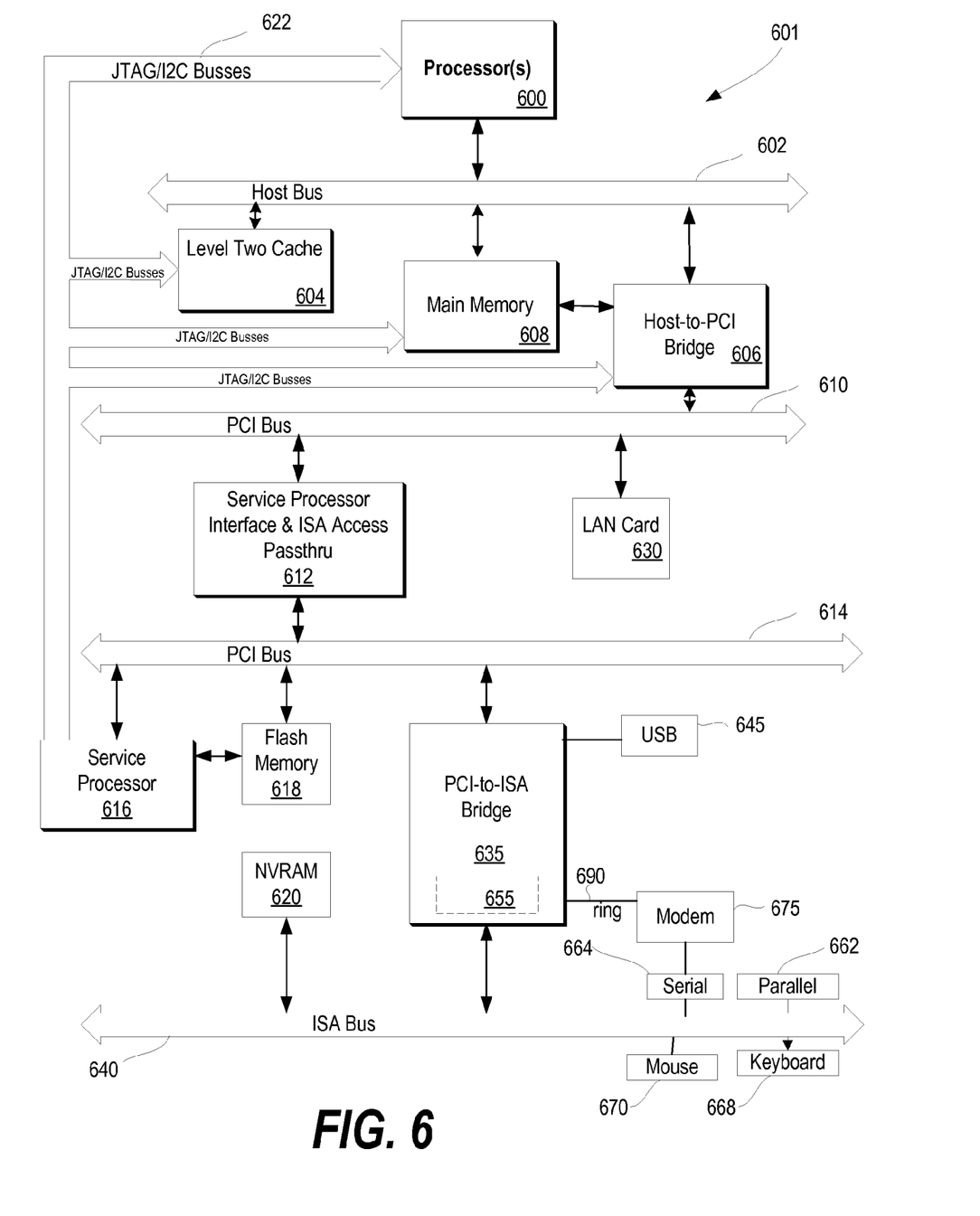
FIG. 6 is a block diagram of a data processing system in which the methods described herein can be implemented.

FIG. 6 illustrates information handling system 601 which is a simplified example of a computer system capable of performing the computing operations described herein. Computer system 601 includes processor 600 which is coupled to host bus 602. A level two (L2) cache memory 604 is also coupled to host bus 602. Host-to-PCI bridge 606 is coupled to main memory 608, includes cache memory and main memory control functions, and provides bus control to handle transfers among PCI bus 610, processor 600, L2 cache 604, main memory 608, and host bus 602. Main memory 608 is coupled to Host-to-PCI bridge 606 as well as host bus 602. Devices used solely by host processor(s) 600, such as LAN card 630, are coupled to PCI bus 610. Service Processor Interface and ISA Access Pass-through 612 provides an interface between PCI bus 610 and PCI bus 614. In this manner, PCI bus 614 is insulated from PCI bus 610. Devices, such as flash memory 618, are coupled to PCI bus 614. In one implementation, flash memory 618 includes BIOS code that incorporates the necessary processor executable code for a variety of low-level system functions and system boot functions.

PCI bus 614 provides an interface for a variety of devices that are shared by host processor(s) 600 and Service Processor 616 including, for example, flash memory 618. PCI-to-ISA bridge 635 provides bus control to handle transfers between PCI bus 614 and ISA bus 640, universal serial bus (USB) functionality 645, power management functionality 655, and can include other functional elements not shown, such as a real-time clock (RTC), DMA control, interrupt support, and system management bus support. Nonvolatile RAM 620 is attached to ISA Bus 640. Service Processor 616 includes JTAG and I2C busses 622 for communication with processor(s) 600 during initialization steps. JTAG/I2C busses 622 are also coupled to L2 cache 604, Host-to-PCI bridge 606, and main memory 608 providing a communications path between the processor, the Service Processor, the L2 cache, the Host-to-PCI bridge, and the main memory. Service Processor 616 also has access to system power resources for powering down information handling device 601.

Peripheral devices and input/output (I/O) devices can be attached to various interfaces (e.g., parallel interface 662, serial interface 664, keyboard interface 668, and mouse interface 670 coupled to ISA bus 640. Alternatively, many I/O devices can be accommodated by a super I/O controller (not shown) attached to ISA bus 640.

In order to attach computer system 601 to another computer system to copy files over a network, LAN card 630 is coupled to PCI bus 610. Similarly, to connect computer system 601 to an ISP to connect to the Internet using a telephone line connection, modem 675 is connected to serial port 664 and PCI-to-ISA Bridge 635.

While FIG. 6 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

One of the preferred implementations of the invention is a software application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method of identifying asset restrictions, said method comprising:
reading a plurality of assets intended to be moved from a first geographical location to a second geographical location, wherein each of the assets includes asset descriptive data;
identifying a plurality of geographical regions that apply to the second geographical location;
retrieving one or more regulatory items for each of the identified geographical regions, wherein one or more of the regulatory items includes regulated item descriptive data;
comparing, by a processor, the asset descriptive data to the regulated item descriptive data;
identifying, by the processor, one of the plurality of assets as a registration asset that requires a registration in order to move the registration asset from the first geographical location to one of the identified geographical regions;
retrieving a link corresponding to an electronic registration form that corresponds to the registration;
generating, by the processor, an exception list that includes the regulatory items that apply to one or more of the plurality of assets based on the comparison, wherein the retrieved link is included in the exception list;
in response to the generating, receiving a selection of the retrieved link from a user;
retrieving the electronic registration form from the retrieved link in response to receiving the selection; and
displaying the retrieved electronic registration form on a display device.

2. The method of claim 1 further comprising:
ordering the plurality of geographic regions based on size of the geographic regions, wherein the regulatory items corresponding to smaller geographic regions are retrieved before retrieving the regulatory items corresponding to larger geographic regions.

3. The method of claim 1 further comprising:
receiving one or more inputs corresponding to one or more fields included in the displayed electronic registration form;
completing the displayed electronic registration form using the received inputs; and
transmitting the completed electronic registration form to a server that processes the electronic registration form.

4. The method of claim 3 wherein the receiving of the one or more inputs further comprises:
gathering the asset descriptive data that corresponds to the registration asset; and
matching the gathered asset descriptive data to the fields included in the displayed electronic registration form; and
wherein the completing further includes automatically filling in one or more of the fields using the matched asset descriptive data.

5. The method of claim 1 wherein the generating the exception list further comprises:
writing to the exception list:
the asset descriptive data corresponding to each of the plurality of assets included in the exception list;
an identifier of one of the plurality of geographical regions that corresponds to the regulated item descriptive data used in the comparison; and
a network address corresponding to network locations of one or more of the regulatory items that correspond to the regulated item descriptive data used in the comparison.

6. The method of claim 1 further comprising:
retrieving one or more network addresses, each of the network addresses corresponding to one or more of the plurality of assets included in the exception list;
including the retrieved network addresses in the generated exception list;
displaying the plurality of assets and a link corresponding to one or more of the plurality of assets that correspond to one of the network addresses;
selecting, by a user, one of the links that corresponds to a selected asset from the plurality of assets; and
retrieving, over a computer network, a data transmission that includes regulatory information that pertains to the selected asset.

7. A information handling system comprising:
one or more processors;
a memory accessible by at least one of the processors;
a nonvolatile storage area accessible by at least one of the processors;
a network interface adapter connecting the information handling system to a computer network; and
a set of instructions stored in the memory, wherein one or more of the processors executes the set of instructions in order to perform actions of:
reading a plurality of assets intended to be moved from a first geographical location to a second geographical location, wherein each of the assets includes asset descriptive data;
identifying a plurality of geographical regions that apply to the second geographical location;
retrieving one or more regulatory items for each of the identified geographical regions, wherein one or more of the regulatory items includes regulated item descriptive data;
comparing the asset descriptive data to the regulated item descriptive data;
identifying one of the plurality of assets as a registration asset that requires a registration in order to move the registration asset from the first geographical location to one of the identified geographical regions;
retrieving a link corresponding to an electronic registration form that corresponds to the registration;
generating an exception list that includes the regulatory items that apply to one or more of the plurality of assets based on the comparison, wherein the retrieved link is included in the exception list;
in response to the generating, receiving a selection of the retrieved link from a user;
retrieving the electronic registration form from the retrieved link in response to receiving the selection; and
displaying the retrieved electronic registration form on a display device.

8. The information handling system of claim 7 further comprising:
ordering the plurality of geographic regions based on size of the geographic regions, wherein the regulatory items corresponding to smaller geographic regions are retrieved before retrieving the regulatory items corresponding to larger geographic regions.

9. The information handling system of claim 7 wherein the set of instructions perform further actions comprising:

receiving one or more inputs corresponding to one or more fields included in the displayed electronic registration form;

completing the displayed electronic registration form using the received inputs; and transmitting the completed electronic registration form to a server that processes the electronic registration form.

10. The information handling system of claim 9 wherein the set of instructions that perform the action of receiving of the one or more inputs perform further actions comprising:

gathering the asset descriptive data that corresponds to the registration asset; and matching the gathered asset descriptive data to the fields included in the displayed electronic registration form; and wherein the set of instructions that perform the action of completing perform further actions that include automatically filling in one or more of the fields using the matched asset descriptive data.

11. The information handling system of claim 7 wherein the set of instructions perform further actions comprising:

retrieving one or more network addresses, each of the network addresses corresponding to one or more of the plurality of assets included in the exception list;

including the retrieved network addresses in the generated exception list;

displaying the plurality of assets and a link corresponding to one or more of the plurality of assets that correspond to one of the network addresses;

selecting, by a user, one of the links that corresponds to a selected asset from the plurality of assets; and retrieving, over a computer network, a data transmission that includes regulatory information that pertains to the selected asset.

12. A computer program product stored in a non-transitory computer readable medium, comprising functional descriptive material that, when executed by an information handling system, causes the information handling system to perform actions that include:

reading a plurality of assets intended to be moved from a first geographical location to a second geographical location, wherein each of the assets includes asset descriptive data;

identifying a plurality of geographical regions that apply to the second geographical location;

retrieving one or more regulatory items for each of the identified geographical regions, wherein one or more of the regulatory items includes regulated item descriptive data;

comparing the asset descriptive data to the regulated item descriptive data;

identifying one of the plurality of assets as a registration asset that requires a registration in order to move the registration asset from the first geographical location to one of the identified geographical regions;

retrieving a link corresponding to an electronic registration form that corresponds to the registration;

generating an exception list that includes the regulatory items that apply to one or more of the plurality of assets based on the comparison, wherein the retrieved link is included in the exception list;

in response to the generating, receiving a selection of the retrieved link from a user;

retrieving the electronic registration form from the retrieved link in response to receiving the selection; and displaying the retrieved electronic registration form on a display device.

13. The computer program product of claim 12 wherein the functional descriptive material causes the information handling system to perform further actions comprising:

ordering the plurality of geographic regions based on size of the geographic regions, wherein the regulatory items corresponding to smaller geographic regions are retrieved before retrieving the regulatory items corresponding to larger geographic regions.

14. The computer program product of claim 12 wherein the functional descriptive material causes the information handling system to perform further actions comprising:

receiving one or more inputs corresponding to one or more fields included in the displayed electronic registration form;

completing the displayed electronic registration form using the received inputs; and transmitting the completed electronic registration form to a server that processes the electronic registration form.

15. The computer program product of claim 14 wherein the wherein the functional descriptive material causes the information handling system to perform further actions comprising:

gathering the asset descriptive data that corresponds to the registration asset; and matching the gathered asset descriptive data to the fields included in the displayed electronic registration form; and wherein the completing further includes automatically filling in one or more of the fields using the matched asset descriptive data.

16. The computer program product of claim 12 wherein the functional descriptive material causes the information handling system to perform further actions comprising:

writing to the exception list:

the asset descriptive data corresponding to each of the plurality of assets included in the exception list;

an identifier of one of the plurality of geographical regions that corresponds to the regulated item descriptive data used in the comparison; and a network address corresponding to network locations of one or more of the regulatory items that correspond to the regulated item descriptive data used in the comparison.

17. The computer program product of claim 12 wherein the functional descriptive material causes the information handling system to perform further actions comprising:

retrieving one or more network addresses, each of the network addresses corresponding to one or more of the plurality of assets included in the exception list;

including the retrieved network addresses in the generated exception list;

displaying the plurality of assets and a link corresponding to one or more of the plurality of assets that correspond to one of the network addresses;

selecting, by a user, one of the links that corresponds to a selected asset from the plurality of assets; and retrieving, over a computer network, a data transmission that includes regulatory information that pertains to the selected asset.

* * * * *